United States Patent [19]

Sherman

[11] Patent Number: 4,914,855

[45] Date of Patent: Apr. 10, 1990

[54] INSECT PICKUP DEVICE

[76] Inventor: Ronald Sherman, 19330 Frenchton Pl., Gaithersburg, Md. 20879

[21] Appl. No.: 335,328

[22] Filed: Apr. 10, 1989

[51] Int. Cl.$^4$ ............................................... A01M 1/16
[52] U.S. Cl. ..................................... 43/136; 294/1.1; 294/24
[58] Field of Search ................... 43/114, 136; 294/1.1, 294/19.1, 24

[56] References Cited

U.S. PATENT DOCUMENTS

| | | | |
|---|---|---|---|
| 979,640 | 12/1910 | Boerngen | 43/136 |
| 1,154,310 | 9/1915 | Hemenway | 43/136 |
| 1,888,563 | 12/1928 | Nixon | 43/136 |
| 3,449,856 | 12/1966 | Weaver | 43/136 |
| 4,052,811 | 10/1977 | Shuster | 43/136 |

Primary Examiner—Nicholas P. Godici
Assistant Examiner—Michael William Starkweather
Attorney, Agent, or Firm—Sughrue, Mion, Zinn, Macpeak & Seas

[57] ABSTRACT

The insect pickup device is comprised of a plurality of detachable components including a first elongated head having a triangular cross-sectional configuration, a second elongated head having a rectangular cross-sectional configuration, an elongated handle structure having the first and second heads detachably secured at opposite ends thereof. The handle structure includes a plurality of tubular members and a dowel for interconnecting the tubular members to provide an elongated handle structure.

3 Claims, 1 Drawing Sheet

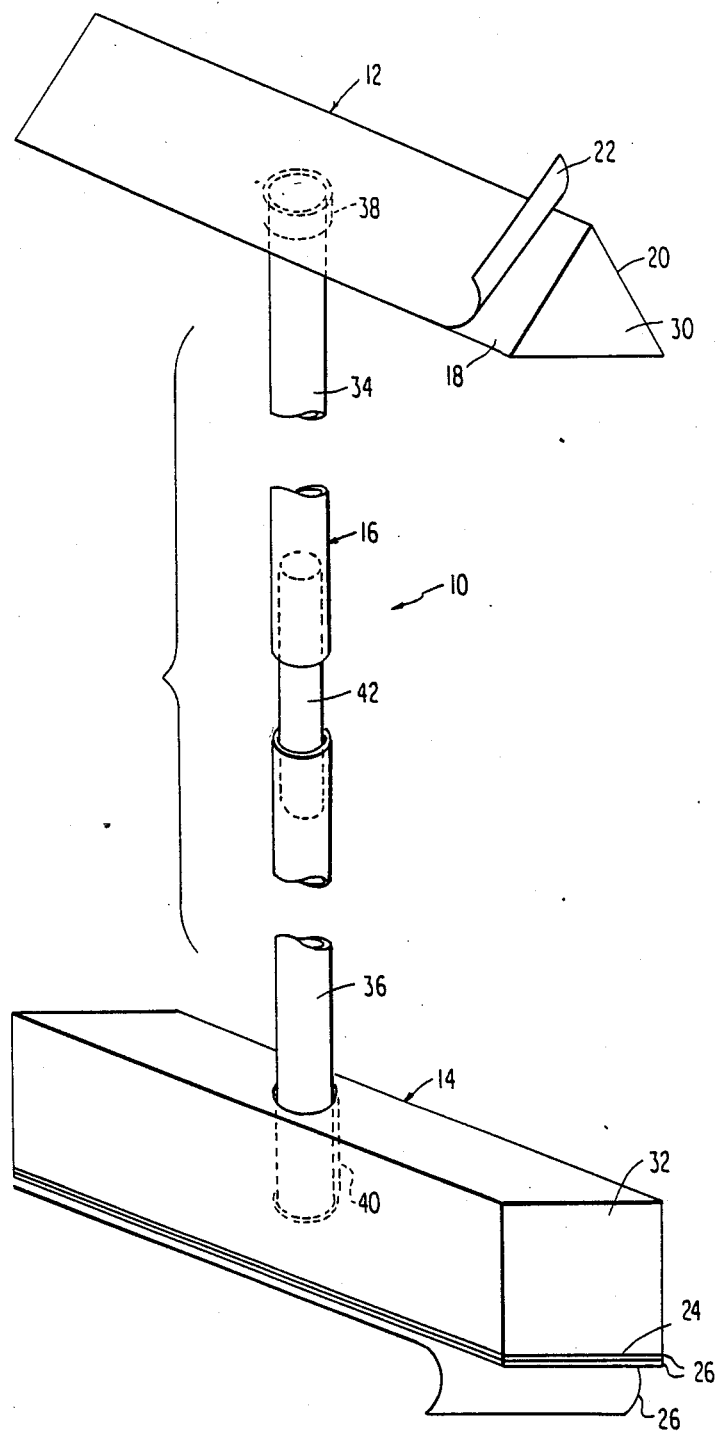

INSECT PICKUP DEVICE

BACKGROUND OF THE INVENTION

The present invention is directed to an insect pickup device and more specifically to an adhesive covered, shaped block on an elongated handle for engaging the picking up insects in remote places.

The use of an adhesive covered member on a handle for catching insects or cleaning hard to reach areas is old and well known in the art.

The patent to Shuster et al. (4,052,811) discloses an insect catching device comprising a rigid body secured on the end of an elongated handle. A wedge-shaped sponge is carried by the rigid body and protrudes beyond the rigid body. A roll of adhesive tape is supported on the body and a length of adhesive tape from the roll is directed over the projecting surface of the sponge and anchored to the rigid body. Thus, insects may be picked up by pressing the adhesive tape against the insect and, upon removal of the tape having the insect thereon, the sponge may be used for cleaning the surface from which the insect was picked up.

The patent to Gitt (4,103,382) discloses an adhesive device for cleaning hard to reach areas which includes a conical-shaped paper head adapted to be secured to the end of an elongated rod. The external conical surface of the head may be covered with a tacky substance or a plurality of tabs may project from the surface of the conical head for engaging and picking up dust and cobwebs in hard to reach places.

SUMMARY OF THE INVENTION

The present invention provides a new and improved insect pickup device which is formed from a number of detachable components to facilitate the quick and easy breakdown and storage of the device while also permitting quick and easy assembly with a different shaped head at opposite ends of an elongated handle to facilitate picking up insects from different shaped surfaces wherein each head may be covered with detachable adhesive means.

The foregoing and other objects, features and advantages of the invention will be apparent from the following more particular description of a preferred embodiment of the invention as illustrated in the accompanying drawings.

BRIEF DESCRIPTION OF THE DRAWINGS

The single FIGURE is a perspective view of the insect pickup device according to the present invention.

DETAILED DESCRIPTION OF THE INVENTION

The insect pickup device 10 is comprised of a first elongated block 12 having a triangular cross-sectional configuration and a second elongated block 14 having a rectangular cross-sectional configuration. The two blocks 12 and 14 are detachably interconnected by a separable handle structure 16 of any desired length.

The blocks 12 and 14 may be made of any suitable length such as wood, plastic or the like and the exact configuration of the blocks may vary from that shown in the drawing. For example, the cross-sectional configuration of the block 12 does not have to be an isosceles triangle, but could be of any other triangular configuration or even a trapezoidal configuration. Likewise, the block 14 does not have to have a square cross-section as illustrated but could have an oblong or rectangular configuration. Furthermore, it is contemplated that blocks having rounded surfaces could also be used which would be complementary to a rounded surface in a room, cupboard or the like from which it might become necessary to pickup an insect. The surfaces 18 and 20 of the block 12 are provided with strips 22 of double-faced adhesive, only one of which is shown in the drawing, since the complete surface 20 is not shown. The bottom surface 24 of the block 14 may also be provided with one or a plurality of double-faced adhesive strips 26. Thus, an adhesive strip may be placed on an operative surface of a selected block when it is desired to use the insect pickup device or a plurality of strips may be placed on the operative surfaces in advance and removed after they have been used to pick up an insect. It is also contemplated that an end surface 30 of the triangular-shaped block 12 or the end surface 32 of the rectangular-shaped block 14 could also be provided with a piece of double-faced adhesive material for insertion into a relatively small opening to pick up an insect therein.

A detachable handle structure 16 is provided for carrying the blocks 12 and 14 at opposite ends thereof. The handle structure 16 is comprised of a pair of hollow, tubular rods 34 and 36 which are adapted to be inserted into complementary bores 38 and 40 in the blocks 12 and 14 respectively. The internal diameter of the bores 38 and 40 is substantially identical to the external diameter of each rod 34 and 36 so that the rods will be held therein with a friction fit. The two rods 34 and 36 are coupled together by means of a dowel or rod 42 which is inserted into the hollow ends of the rods 34 and 36. Once again, a friction fit is contemplated between ther rod 40 and the rods 34 and 36. It is obvious that the rods 34 and 36 could be solid and the rod 42 hollow, in which case the ends of the rods 34 and 36 would be frictionally held within the hollow rod 42.

The insect pickup device would ordinarily be sold and stored in the disassembled condition to facilitate a reduction in the size of the package containing the components of the device. If it is desired to pick up an insect crawling in the middle of a flat ceiling, the rectangular block 14 would be selected along with one or more of the rods 34, 36 amd 42, depending upon the height of the ceiling and the person using the insect pickup device. A double-faced adhesive strip 26 would be applied to the surface of the block 14 opposite the bore 40 if the block 14 did not already have one or more adhesive strips 26 secured thereto. The block 14 would then be raised toward the ceiling and the surface of the adhesive strip 26 on the block 14 would be pressed lightly into engagement with the insect so as to adhere the insect to the strip without mashing the insect against the ceiling and leaving a stain. If the insect was adjacent the intersection of a wall with the ceiling, the triangular-shaped block 12 would be used instead of the rectangular block 14 so that the block would fit better into the angle defined between the wall and the ceiling.

After purchasing the insect pickup device, the components can be completely assembled, as shown in the drawings, with blocks having different configurations on opposite ends of the handle assembly. Other types of handle assemblies could be utilized wherein the handle assembly would be telescopic in operation to provide additional reach for the person using the device. Likewise the various components could be permanently secured together or detachably connected by other types of connections.

While the invention has been particularly shown and described with reference to preferred embodiments thereof, it will be understood by those in the art that the foregoing and other changes in form and detail may be made therein without departing from the spirit and scope of the invention.

What is claimed is:

1. An insect pickup device comprising:
   elongated handle means,
   a first head comprised of an elongated three-sided member having a triangular cross-section with a hole in one of said sides in which one end of said handle means is secured,
   a second head comprised of an elongated four-sided member having a rectilinear cross-section with a hole in one of said sides in which another end of said handle means is secured, and
   adhesive means detachably secured to at least one side of each of said heads.

2. An insect pickup device as set forth in claim 1, wherein said handle means is comprised of at least two rods and a connecting member for connecting said two rods together in longitudinal alignment with each other.

3. An insect pickup device as set forth in claim 1, wherein said adhesive means is comprised of at least one piece of double-faced adhesive tape secured to each head.

* * * * *